(12) United States Patent
Morris et al.

(10) Patent No.: US 6,263,967 B1
(45) Date of Patent: Jul. 24, 2001

(54) WELL COMPLETION CLEAN-UP FLUIDS AND METHOD FOR CLEANING-UP DRILLING AND COMPLETION FILTERCAKES

(76) Inventors: Elizabeth W Morris, 71, Sunnyside Road, Aberdeen AB24 3LT; Jonathan M Davison, Monaltrie House, St. Maman Road, Torphins, Aberdeenshire, AB31 4JQ, both of (GB)

( * ) Notice: Subject to any disclaimer, the term of this patent is extended or adjusted under 35 U.S.C. 154(b) by 0 days.

(21) Appl. No.: 09/328,843

(22) Filed: Jun. 9, 1999

(30) Foreign Application Priority Data

Jun. 12, 1998 (GB) .................................................. 9812815

(51) Int. Cl.[7] ............................ E21B 37/00; E21B 43/25; E21B 43/27; E21B 43/28; E21B 37/08
(52) U.S. Cl. ............................................. 166/312; 507/241
(58) Field of Search ..................................... 166/300, 311, 166/312, 291; 507/241

(56) References Cited

U.S. PATENT DOCUMENTS

| 4,888,121 | 12/1989 | Dill et al. ................................ 507/241 |
| 4,995,461 | * 2/1991 | Sydansk ................................ 166/295 |
| 5,223,159 | * 6/1993 | Smith et al. ............................. 507/203 |
| 5,259,980 | * 11/1993 | Morris et al. .......................... 510/109 |
| 5,783,527 | * 7/1998 | Dobson, Jr. et al. ................. 507/269 |
| 6,131,661 | * 10/2000 | Conner et al. ......................... 166/300 |
| 6,143,698 | * 11/2000 | Murphey et al. ...................... 507/145 |

FOREIGN PATENT DOCUMENTS 2282619  4/1995  (GB) .

* cited by examiner

*Primary Examiner*—David Bagnell
*Assistant Examiner*—Jennifer M Hawkins
(74) *Attorney, Agent, or Firm*—Howrey Simon Arnold & White; Stephen H. Cagle; Carter J. White

(57) ABSTRACT

A process for cleaning-up drilling and completion fluid filtercakes using an aqueous wash containing water and cationic salts of polyaminocarboxylic acids at neutral or acidic pH.

10 Claims, 2 Drawing Sheets

WELL COMPLETION CLEAN-UP FLUIDS AND METHOD FOR CLEANING-UP DRILLING AND COMPLETION FILTERCAKES

FIELD OF THE INVENTION

The present invention relates to the construction of wells, and more particularly to the clean-up of drilling and completion filtercakes or other well reservoir damages.

BACKGROUND OF THE INVENTION

In the process of rotary drilling a well, a drilling fluid or mud is being circulated down the rotating drill pipe, through the bit, and up the annular space between the pipe and the formation or steel casing, to the surface. The drilling fluid performs different functions such as removal of drilled cuttings from the bottom of the hole to the surface, suspension of cuttings and weighting material when circulation is interrupted, control of subsurface pressures, maintaining the integrity of the wellbore until the well section is cased and cemented to suspend cuttings and weighting material when the circulation is interrupted, control subsurface pressure, isolate the fluids from the formation by providing sufficient hydrostatic pressure to prevent the ingress of formation fluids into the wellbore, cool and lubricate the drill string and bit, maximise penetration rate etc.

The required functions can be achieved by a wide range of fluids composed of various combination of solids, liquids and gases and classified according to the constitution of the continuous phase mainly in two groupings : aqueous (water-based) drilling fluids, and non-aqueous (mineral oil or synthetic-base) drilling fluids, commonly 'oil-base fluids'.

For all fluid types, it is desirable to minimise the permeability damage in drilling reservoir formations when in fact, during the operations for drilling and completing hydrocarbon-bearing formations (reservoirs), an overbalance pressure is often applied which causes fluid loss from the wellbore into the reservoir rock. This filtration process causes build-up of a low permeability filtercake, comprised of the solid phases present in the fluid. The presence of this cake can be detrimental to the production of hydrocarbons from the reservoirs.

It is well known to use wash fluids to break-up and dissolve (wholly or partly) the filtercake. The fluids used to drill and complete the reservoir are generally polymer solutions with various additives including calcium carbonate, clay and salt. The polymer solutions are typically comprised of one or more of the following: biploymers (Xanthan, Scleroglucan), starches and celluloses (hydroxyethyl cellulose[HEC], polyanionic cellulose [PAC]). The filtercakes are therefore comprised of these components, plus drilled solids picked up during the drilling phase.

It is preferable to remove as many of these components as possible from the filtercake which has built up on the producing formation. There are various chemicals and methods used for removal of these cakes. These include: aqueous solution with oxidiser present, acid wash solution (hydrochloric acids, organic acids such as formic and acetic), combinations of acid and oxidiser, and aqueous solution with enzymes. The oxidisers and enzymes attack the polymers whilst the acids mainly attack the carbonate and polymers. For the majority of the recent drilling fluids used in reservoir sections, the acids do not substantially break-down the polymeric component and in fact are used for removal of the calcium carbonate. This facilitates the back-production of the filtercake through the screens and limits damage of the completion.

SUMMARY OF THE INVENTION

According to the present invention, there is provided an aqueous wash composition suitable for the clean-up of drilling and completion fluid filtercakes comprising water and an effective amount of cationic salts of polyaminocarboxylic acids at neutral or acidic pH.

The present invention further provides a process for completing a wellbore comprising applying the aqueous wash composition—in aqueous or gelled form—prior to producing from the reservoir.

The present invention is particularly advantageous in the sense that there are a number of problems associated with using hydrochloric and organic acids for the carbonate removal, these include health, safety and environment issues, corrosion issues and placement issues of the acid across the wellbore interval to be treated. Laboratory tests have also shown that the acids can be damaging to the reservoir rock matrix. On the other hand, the new aqueous wash fluid of the invention has been shown to be superior in terms of safer health, safety and environment issues, low corrosion rates, flexible placement chemistry and low levels of formation damage.

DRAWINGS

DETAILED DESCRIPTION OF THE INVENTION

Figure 1:
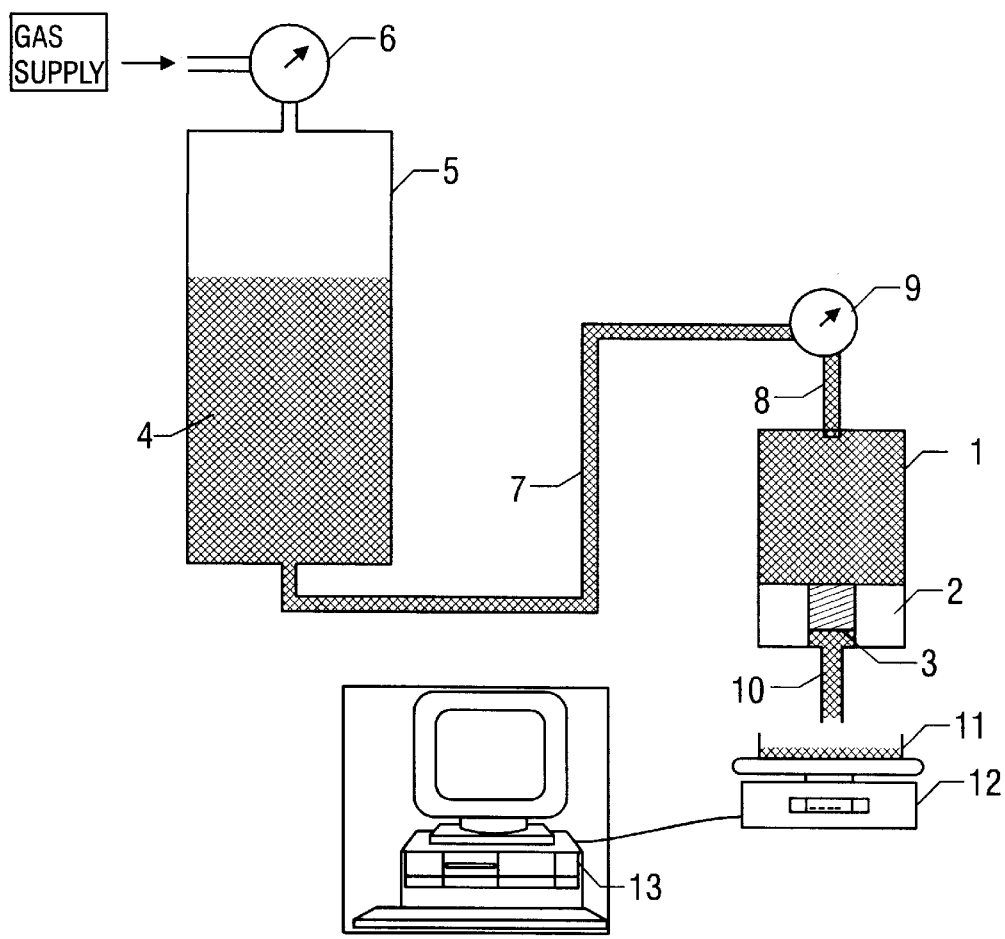
FIG. 1 shows an apparatus used to measure the initial and final permeability of sandstone core plugs.

Cationic salts of polyaminocarboxylic acids suitable to the clean-up of drilling and completion fluid filtercake are at neutral or mild pH, ranging from 3.5 to 8.0.

Example of specific suitable salts of polyaminocarboxylic acids for cleaning-up filtercakes include di-cationic salts of ethylenediaminetetraacetic acid (EDTA), cyclohexylene dinitrilo tetraacetic acid (CDTA), [Ethylenebis (oxyethylenenitrilo)]tetraacetic acid (EGTA, also known as Ethyleneglycolbis-(beta-aminoethyl ether) N,N'-tetraacetic acid) and [[(Carboxymethyl)imino]bis(ethylenenitrilo)]-tetra-acetic acid (DTPA, also known as Diethylenetriaminepentaacetic acid. Aqueous solutions comprising such salts are characterised by their chelating properties.

In a preferred embodiment of the present invention, the wash fluid is an aqueous solution of a di-sodium or di-potassium salt of EDTA at a pH of 4.7–5.5. The EDTA-type chemicals exist in tetra- or di-cation forms. It is the di-cation forms which give a pH in the required range of application. The commonest salts are di-sodium and di-potassium forms, however, the latter has much greater solubility and hence much stronger chelating properties compared to the sodium version. It is this form of the salt which we have concentrated the majority of our testing on and we envisage that this is the optimum form of the compound.

EDTA is currently used as a sequestering agent in various fluids which are used to stimulate reservoirs, however, the EDTA is the standard chemical configuration (tetra-sodium EDTA) with an alkaline pH.

At neutral or mild pH, there is a dual action of dissolution of the calcium carbonate in the filtercake. The calcium in the carbonate is chelated whilst the protons promote carbonate dissolution. The optimum pH for this reaction is ~4.7, however, the rate of calcium carbonate dissolution can be controlled by the starting pH of the system (the more neutral the pH, the slower the reaction).

The same solutions can be used for cleaning filtercakes not necessarily containing carbonate. The strong chelating properties of the EDTA-type chemicals also prevent the re-precipitation of inorganic salts, such as iron compounds, which can also be damaging to the overall productivity of the reservoir. The solutions according to the present invention are essentially useful for treating the reservoir zone prior to producing. Another application is for remedial treatnent, for instance to clean gravel. In this latter case, the clean-up fluid can be used in a gelled form, well appropriate to treat a small zone of the wellbore.

The EDTA-type solution can be applied as a straight wash solution without other additives, or other chemicals could also be added to aid break-down of the filtercake. An example is the addition of an enzyme or oxidiser to aid in the clean-up of the polymeric material.

Corrosion figures for the solution show it is essentially non-corrosive, a facet of great importance when screens are being used in the completion. The reported corrosion rate of di-potassium EDTA on mild steel is less than 10 mpy and it is safe to use on 13% Chrome steels without any inhibitor. Being non-corrosive also helps in terms of heath, security and environment issues and handling/logistics concerns.

EXAMPLE 1

The apparatus shown in FIG. 1 is used to measure the initial and final permeability of sandstone core plugs. A core holder, located in a high pressure/lhigh temperature cell 1, and comprising a pair of jaws 2 tightens a rock sample 3. The fluid 4 used in permeability calculation is stored in a pressurised reservoir 5. The pressure in the reservoir 5 is adjusted using a regulator 6 to control gas supply. A double U-bend 7 conduit supplies the HT/HP cell 1 with the fluid 4 in the reservoir 5, through an upper valve stem 8. A pressure transducer 9 is provided on the conduit 7 for accurate measurement of pressure difference. The fluid passing through the rock core sample 3 falls through a lower valve stern 10 onto the receptacle 11 of a balance 12 logging to a personal computer 13 to measure flow.

Figure 2:
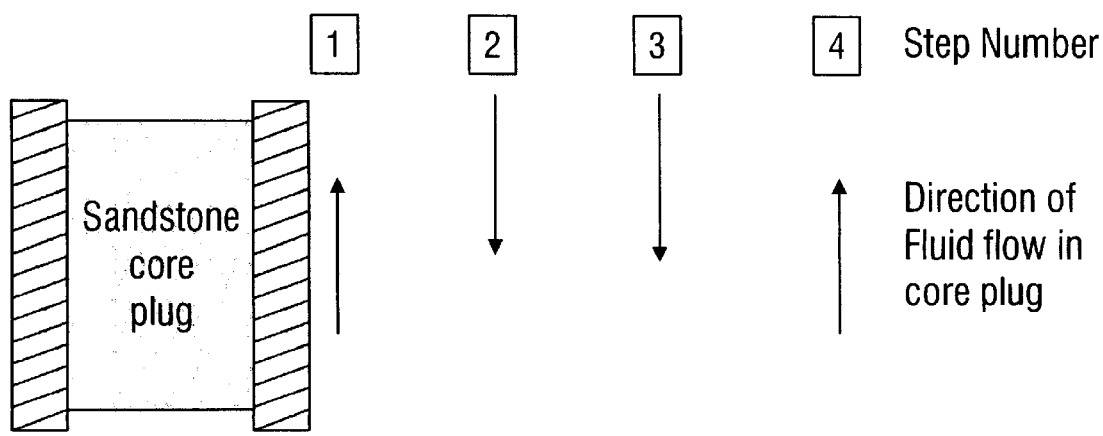
FIG. 2 shows the direction of the fluid flow in the core plugs during the permeability test steps.

The testing of the fluids was according to the following protocol, schematically illustrated FIG. 2 where the arrows indicate the direction of the fluid flow in the core plugs (upwards arrows correspond to fluid loss from the subterranean rock to the wellbore while downwards arrows characterise fluid loss from the wellbore into the subterranean rock.
Step 1: measure the initial permeability of a sandstone core plug using a reference oil.
Step 2: 'apply' mud damage, using a typical reservoir drilling fluid under typical reservoir conditions.
Step 3: 'apply' the wash fluid with a typical overbalance in pressure from the wellbore to the formation. After two hours, the clean-up fluid was shut-in with no differential pressure applied.
Step 4: measure the return permeability of the sandstone core plug using the reference oil and the conditions applied during step 1.

The retained permeability is the ratio of the permeability measured at step 4 relative to step 1.

Steps 1 and 4 occur at ambient temperature, steps 2 and 3 at 71° C. (160 ° F.).

For step 1, time and pressure are varied depending on the sandstone core plug characteristics (i.e. permeability) but for step 4 conditions are exactly the same as step 1, for each plug tested, as to the pressure, temperature and flow-rate. Pressure varies between 4 and 8 psi (0.027 MPa and 0.055 MPa). As to step 1, time is approximately 60 minutes and about 120 minutes for step 4 since it takes longer to reach steady state compared to the initial permeability measurement due to the damage caused by the drilling fluid/clean-up solution being cleaned up prior to reaching a steady state flow rate.

For step 2, the core plug is in contact with the drilling fluid during 6 hours, at a pressure of 500 psi (3.45 MPa).

For step 3, before shut-in, a pressure of 100 psi (0.69 MPa) is applied. The core plug remains in contact with the wash fluid during 14 hours, a typical duration for a wash treatment, though those skilled in this art will appreciate that this can be quite variable depending on the type of the reservoir completion for instance.

The reference oil used for steps 3 and 4 is a mineral oil essentially consisting of iso-paraffin (Isopar, Exxon Chemicals). The 'damaging' wellbore fluid is a typical water-based completion fluid whose composition is set forth in table I below.

TABLE I

| Chemical/Product | Function | Concentration (g/l) |
|---|---|---|
| Water | base fluid | 897.8 |
| Calcium chloride salt | density of base fluid | 98.7 |
| Scleroglucan biopolymer | viscosity | 4.3 |
| Starch | fluid loss control | 14.3 |
| Calcium carbonate | bridging/fluid loss | 45.0 |

Three different clean-up fluids were tested including a hydrochloric acid solution, a formic acid solution and a $K_2$-EDTA solution according to the present invention. The compositions of the clean-up fluids are set forth in table II below.

TABLE II

| Clean-up fluid formulations | Formulations | Concentrations (wt %) |
|---|---|---|
| Hydrochloric acid solution | Conc. HCl | 7.5 |
| | Corrosion inhibitor | 0.5 |
| | Oxidiser | 0.3 |
| | Water | 91.7 |
| Formic acid solution | Conc. Formic acid | 9 |
| | Corrosion inhibitor | 0.1 |
| | Oxidiser | 0.3 |
| | Water | 90.6 |
| EDTA solution | $K_2$-EDTA | 27.3 |
| | Water | 72.7 |

The pH of the di-potassium EDTA fluid is 4.7.

Figure 3:
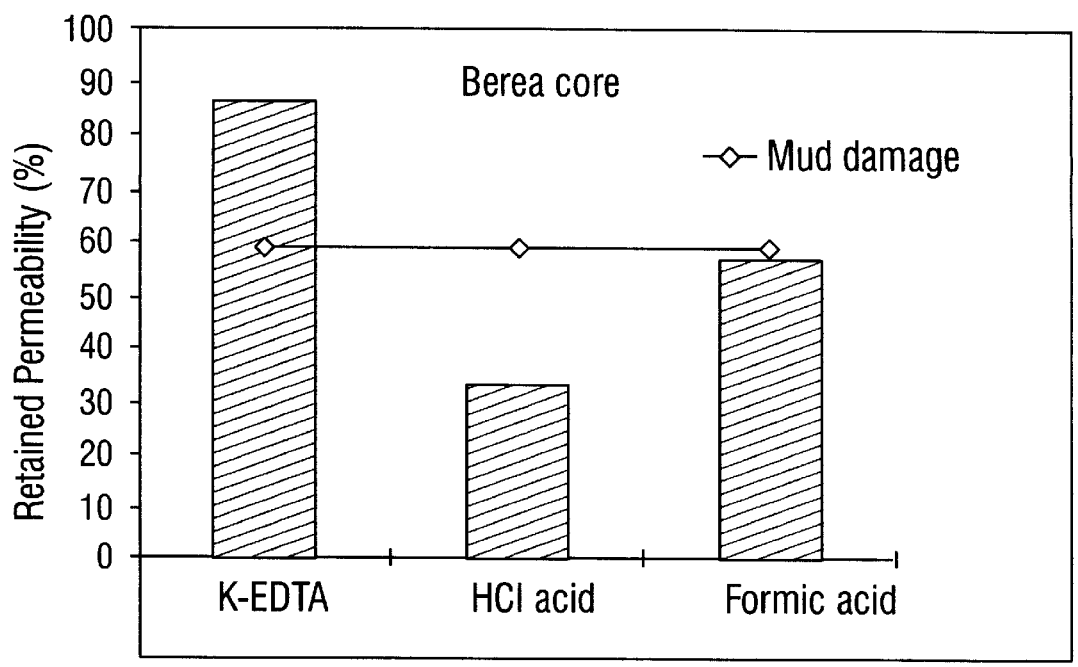
FIG. 3 is a bar graph which shows the retained permeability of Berea sandstone core when different clean-up fluids are used.
Figure 4:
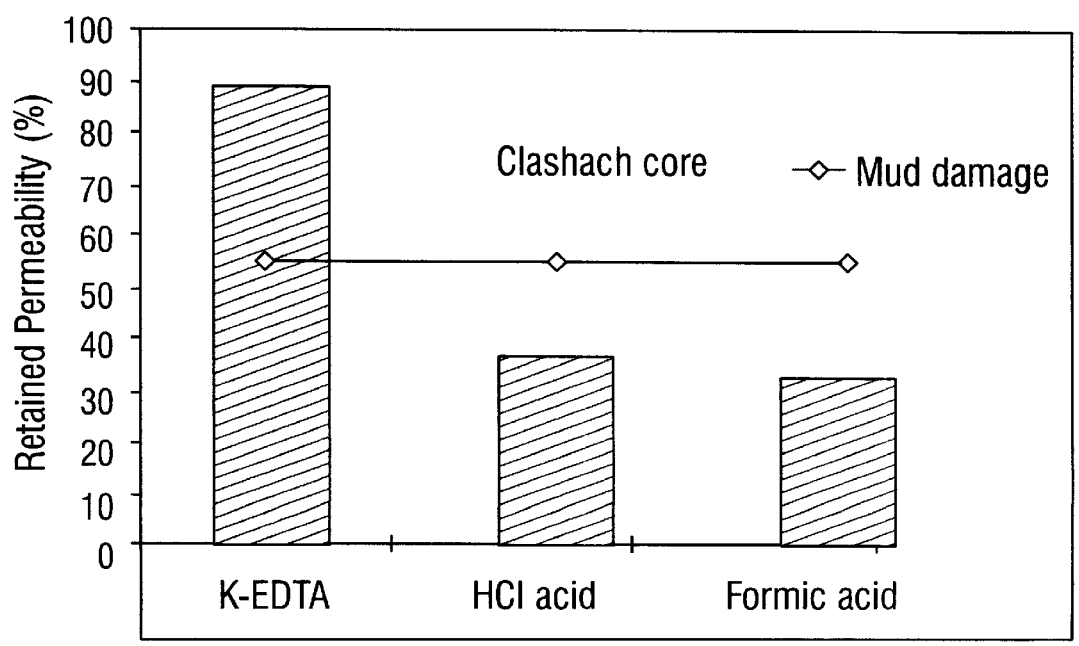
FIG. 4 is a bar graph which shows the retained permeability of Clashach sandstone core when different clean-up fluids are used.

The results for two series of tests, using Berea and Clashach Sandstones, are presented in table III below and in FIGS. 3 and 4, respectively. Also plotted on these graphs are the 'base-line' damage derived from using mud alone without any clean-up (i.e. omitting step 3 above).

Table III

| Clean-Up fluid | Berea Core | Clashach Core |
|---|---|---|
| Hydrochloric acid | 33 | 37 |
| Formic acid | 57 | 32 |
| $K_2$-EDTA | 86 | 89 |

These results demonstrate that acids can be deleterious to the formation permeability, creating more damage than if no clean-up washes were applied at all. The EDTA-type chemicals improve the formation permeability whilst removing the majority of the carbonate.

EXAMPLE 2

The affect of the pH on the carbonate dissolution was demonstrated during the formation damage tests reported in example 1 above. The majority of the tests utilised the di-potassium EDTA at pH 4.7, however, two tests were conducted at pH 4.3. The dissolution of the carbonate in the filtercake was very different; at pH 4.7 more than about 95% of the carbonate was removed whereas at pH 4.3 only about 25% was removed.

The pH of the solution can be altered to either promote or slow-down the proton attack. This permits a flexible reaction time and 'spending' of the solution. The desire is to have a relatively slow reaction time to allow good coverage of the wash solution across the area of the wellbore to be treated. For long, open-hole completion, this can be an important factor which traditional acids are not good for. The fast reaction time means that the carbonate filtercake which the acid contacts first is dissolved almost immediately, leading to loss of the acid in this relatively high permeability zone thereby leaving the rest of the section untouched by the wash fluid.

It is proposed that the EDTA-type compounds would have a reaction time which would permit effective placement of the clean-up solution, whilst still proving effective in cleaning up the drilling fluid filtercake.

On the other hand, the fast reaction times and aggressive nature of the acids can be deleterious to the producing formation permeability, and hence productivity. A number of laboratory tests have been completed to illustrate this fact.

EXAMPLE 3

The EDTA-type compound of the present invention can be either used in solution form as shown in example 1 or in a gelled form. In this later case, the base fluid is advantageously an aqueous viscoelastic surfactant based fluid including a thickener comprising an aqueous medium and an effective amount the gelling agent is preferably based on a viscoelastic surfactant capable of forming wormlike micelles as described in EP-A-835 983. A thickening composition comprised of 75% of a quaternary ammonium salts such as erucyl bis(2-hydroxyethyl) methyl ammonium chloride and 25% of 2-propanol is particularly preferred.

An example of a gelled design is as follows :100 (% volume) $K_2$-EDTA (pH=5.0), 3% by weight ammonium chloride and 4% (by volume) of the above preferred thickening composition. This design provides at a shear rate of $170s^{-1}$, a viscosity of 300 cP (0.3 $g.cm^{-1}.s^{-1}$) at 21° C. (70° F.) and of 105 cP (0.105 $g.cm^{-1}.s^{-1}$) at 60° C. (140° F.).

The solution could be placed for treating the filtercake at various points in the drilling, completion and workover operations:

1) After drilling the reservoir section, the solution could be applied prior to producing from the formation.
2) After drilling the reservoir section, the solution could be applied prior to completions operations (eg. gravel packing, running screens) prior to producing from the reservoir.
3) After drilling the reservoir section, the solution could be applied after completions operations prior to producing from the reservoir.
4) After drilling the reservoir section, the solution could be applied in a gelled form when placing the gravel in the wellbore prior to producing from the reservoir.
5) After drilling the reservoir section, the solution could be applied after producing from the reservoir, where remedial treatment is necessary.
6) After drilling a wellbore, the solution could be applied to clean-up the drilling fluid filtercake prior to using the well as an injector for production from another well.

What is claimed is:

1. A wellbore completion process comprising drilling a well with a drilling fluid and then cleaning-up a filtercake, using an aqueous wash composition comprising water and an effective amount of cationic salts of polyaminocarboxylic acids at neutral or acidic pH.

2. A wellbore completion process comprising drilling a well using drilling fluid followed by removal of a filtercake, using an aqueous wash composition comprising water, an effective amount of cationic salts of polyaminocarboxylic acids at neutral or acidic pH, and an enzyme or oxidiser.

3. A wellbore completion process comprising drilling a well using drilling fluid followed by removal of a filtercake, using an aqueous wash composition of claim 2 wherein the cation is potassium.

4. A wellbore completion process comprising drilling a well using drilling fluid followed by removal of a filtercake, using an aqueous wash composition of claim 3 wherein the pH is between 3.5 and 8.0.

5. A wellbore completion process comprising drilling a well using drilling fluid followed by removal of a filtercake, using an aqueous wash composition comprising water and an effective amount of cationic salts of polyaminocarboxlic acids at neutral or acidic pH wherein the polyaminocarboxylic acid is a di-cation salt of (ethylenedinitrilo) tetraacetic acid.

6. A wellbore completion process comprising drilling a well using drilling fluid followed by removal of a filtercake, using an aqueous wash composition of claim 5 wherein the cation is potassium.

7. A method of cleaning a wellbore filtercake comprising applying a wash composition comprising water and an effective amount of cationic salts of polyaminocarboxylic acids at neutral or acidic pH with an overbalance in pressure from a wellbore to a formation.

8. A method for cleaning a wellbore filtercake comprising applying the wash composition of claim 7 under overbalanced conditions.

9. A method for cleaning a wellbore filtercake comprising applying a wash composition comprising water and an effective amount of cationic salts of polyaminocarboxylic acids at neutral or acidic pH wherein the polyaminocarboxylic acid is a dication salt of (ethylenedinitrilo) tetraacetic acid under overbalanced conditions.

10. A method for cleaning a wellbore filtercake comprising applying the wash composition of claim 9 wherein the cation is potassium under overbalanced conditions.

* * * * *